United States Patent
Stein et al.

(10) Patent No.: US 9,451,857 B2
(45) Date of Patent: Sep. 27, 2016

(54) BEARING ARRANGEMENT OF A ROTATING BRUSH ROLLER

(71) Applicant: Stein & Co. GmbH, Velbert (DE)

(72) Inventors: Thomas Stein, Velbert (DE); Achim Liffers, Velbert (DE)

(73) Assignee: Stein & Co. GmbH, Velbert (DE)

( * ) Notice: Subject to any disclaimer, the term of this patent is extended or adjusted under 35 U.S.C. 154(b) by 621 days.

(21) Appl. No.: 14/004,988

(22) PCT Filed: Oct. 17, 2012

(86) PCT No.: PCT/DE2012/001027
§ 371 (c)(1),
(2) Date: Sep. 13, 2013

(87) PCT Pub. No.: WO2013/056695
PCT Pub. Date: Apr. 25, 2013

(65) Prior Publication Data
US 2014/0066278 A1  Mar. 6, 2014

(30) Foreign Application Priority Data
Oct. 18, 2011  (DE) .......... 10 2011 116 418

(51) Int. Cl.
*A47L 5/10* (2006.01)
*A47L 5/26* (2006.01)
(Continued)

(52) U.S. Cl.
CPC ............ *A47L 9/0477* (2013.01); *A46B 13/001* (2013.01); *A46B 13/02* (2013.01); *A47L 9/0455* (2013.01); *A47L 11/4041* (2013.01); *F16C 13/02* (2013.01)

(58) Field of Classification Search
CPC .......................... A47L 9/0455; A47L 9/0477
USPC ..................................... 15/391–392
See application file for complete search history.

(56) References Cited

U.S. PATENT DOCUMENTS

| 22,678 A | 1/1859 | Smith |
| 2,734,211 A | 2/1956 | Vance |

(Continued)

FOREIGN PATENT DOCUMENTS

| DE | 197 28 380 | 1/1999 |
| EP | 1 639 932 | 3/2006 |

(Continued)

OTHER PUBLICATIONS

PCT International Search Report of the International Searching Authority for International Application PCT/DE2012/001027, mailed Feb. 14, 2013, 2 pages, European Patent Office, HV Rijswijk, Netherlands.

(Continued)

*Primary Examiner* — Bryan R Muller
(74) *Attorney, Agent, or Firm* — W. F. Fasse

(57) ABSTRACT

A rotating brush roller for a floor cleaning device has its ends supported via a bearing in a support arrangement of a brush housing. A brush strip is received in a spiral groove in an outer circumferential surface of the brush roller. The support arrangement includes a stationary cover and defines an access opening. A removable cover is releasably secured to the brush housing by a catch element, and selectively covers or uncovers the access opening, allowing access to the brush strip at an end of the spiral groove. A first deflector element on the stationary cover and a second deflector element on the removable cover together form a thread deflector that cooperates with a counter element on the end of the brush roller.

16 Claims, 2 Drawing Sheets

(51) Int. Cl.
*A47L 9/04* (2006.01)
*A47L 11/40* (2006.01)
*A46B 13/00* (2006.01)
*A46B 13/02* (2006.01)
*F16C 13/02* (2006.01)

(56) References Cited

U.S. PATENT DOCUMENTS

| | | | |
|---|---|---|---|
| 3,225,374 | A | 12/1965 | Daley et al. |
| 3,233,274 | A | 2/1966 | Kroll |
| 3,284,830 | A | 11/1966 | Kroll |
| 3,874,017 | A | 4/1975 | Parker |
| 4,437,199 | A | 3/1984 | Wulf et al. |
| 4,456,136 | A | 6/1984 | Pálsson |
| 5,231,725 | A * | 8/1993 | Hennessey ............... E01H 1/056 15/179 |
| 5,249,328 | A | 10/1993 | Shin |
| 5,272,785 | A | 12/1993 | Stegens |
| 5,509,162 | A * | 4/1996 | Burgoon .................. A47L 11/24 15/340.3 |
| 7,805,795 | B2 | 10/2010 | Stein et al. |
| 2003/0145424 | A1 | 8/2003 | Stephens et al. |
| 2006/0064828 | A1 * | 3/2006 | Stein ..................... A47L 9/0455 15/41.1 |
| 2013/0042429 | A1 | 2/2013 | Misumi et al. |
| 2014/0000054 | A1 | 1/2014 | Liffers et al. |

FOREIGN PATENT DOCUMENTS

| | | |
|---|---|---|
| WO | WO 2006/061045 | 6/2006 |
| WO | WO 2011/125580 | 10/2011 |

OTHER PUBLICATIONS

PCT International Preliminary Report on Patentability including English Translation of PCT Written Opinion of the International Searching Authority for International Application PCT/DE2012/001027, issued Apr. 22, 2014, 7 pages, International Bureau of WIPO, Geneva, Switzerland.

* cited by examiner

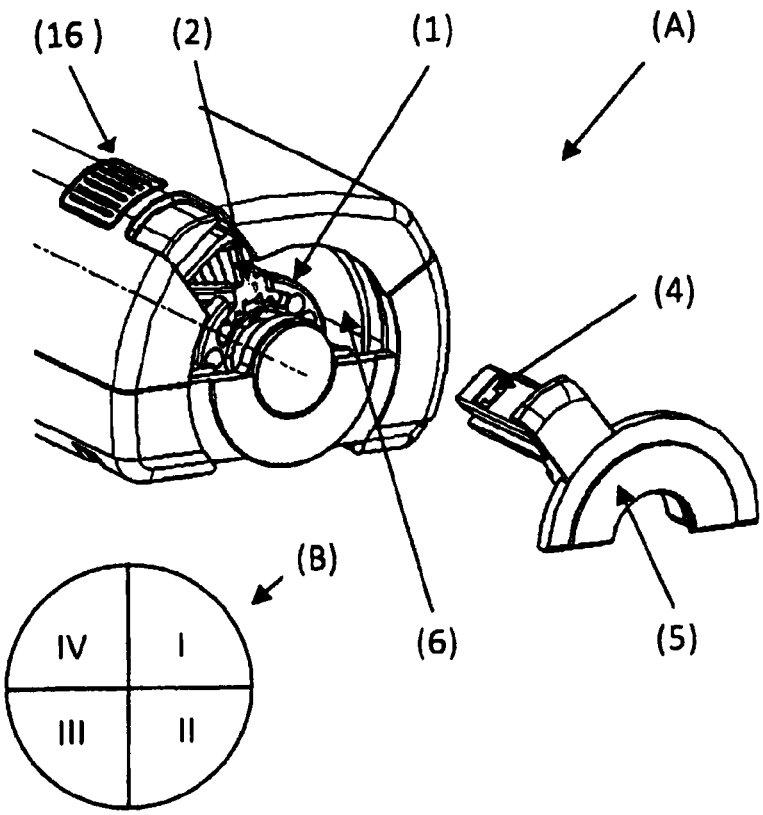
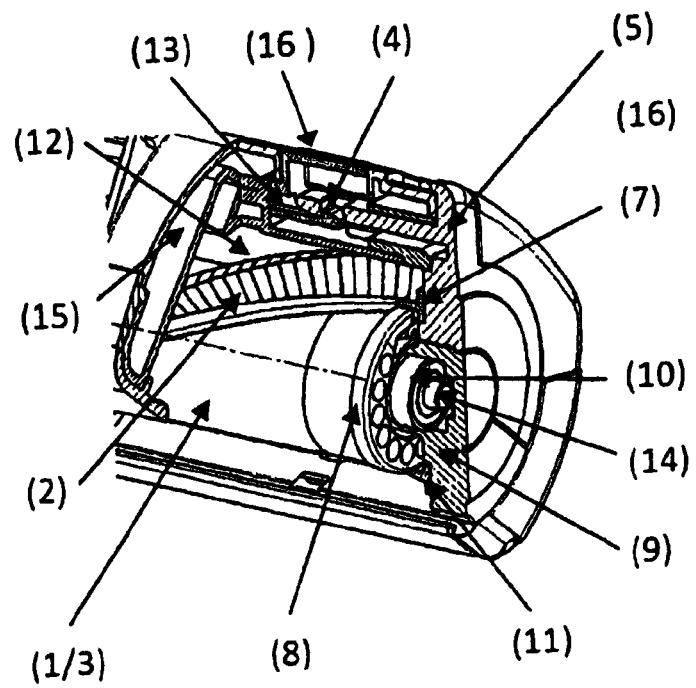
FIG. 1
FIG. 2

BEARING ARRANGEMENT OF A ROTATING BRUSH ROLLER

FIELD OF THE INVENTION

The invention relates to a bearing arrangement of a rotating brush roller of a floor care device, especially carpet cleaning device in the form of a brush vacuum cleaner or a brush attachment or accessory, wherein the brush roller is arranged by outwardly located end pieces via bearings in a support arrangement of a brush housing, and the brush roller comprises a spirally extending receiving shaft with an outwardly located through passage area for receiving and retaining a continuous brush strip as well as an opening on the end face side for provision and removal, and the outer area is covered by a closure part as a support or carrying arrangement, wherein the closure part comprises a releasable sub-element, which uncovers an end face opening for removing the brush strip.

BACKGROUND INFORMATION

Embodiments of this type for rotating reception of a brush roller of a floor care device are known in various different embodiments. It has been found to be persistently troublesome, however, that for the exchange of an installed brush strip, the brush housing must be disassembled partially with tools in order to exchange the brush strip. This measure is often only possible by the expert or skilled workman, and can only be carried out conditionally or with limitations by the user.

A removable closure element for uncovering an opening in a bearing bracket or plate for the exchange of a brush strip out of a receiving shaft is already known according to the DE 197 28 380 C1.

SUMMARY OF THE INVENTION

It is an object of one or more embodiments of the invention to provide a bearing arrangement for brush rollers according to the above general field of the invention, which makes an exchange of a continuous brush strip possible in a simple manner without tools, and thereby ensures a retaining or maintaining of the installed brush roller, as well as making possible a thread deflector for the protection of the bearing locations.

The solution of the above object is achieved according to an embodiment of the invention in that the sub-element as a removable access cover is releasably lockable or fixable with a holding element such as a catch element for a corresponding unlockable counter support in the brush housing, and the sub-element carries a segment of a deflector element arranged concentrically to the brush roller in continuation or supplementation of a stationary deflector element, which is arranged with a counter element in the form of a rib on the brush roller body as a thread deflector, wherein the brush roller with the counter element as a rib of plastic corresponds with the deflector elements of the carrier or support element of metal.

Hereby an end face opening is uncovered in a simple manner, which makes possible an access to the receiving shaft with the brush strip. By the catch element with an unlocking it is thereby possible for a non-expert without tools to remove and again fix or secure the sub-element, and additionally to make possible the embodiment of a thread deflector for the protection of the bearing locations.

An advantageous embodiment exists in that the opening uncovered by the sub-element of the closure part is formed in the upper area of a rotation circle of the brush roller.

In further development of the invention it is provided that the bearing is fixed in the carrier or support arrangement and a shaft end of the brush roller is slidably arranged in the bearing as a slide bearing.

Alternatively it is suggested that the bearing as a ball bearing is fixed on a shaft end of the brush roller and slidably arranged in the carrier or support arrangement.

BRIEF DESCRIPTION OF THE DRAWINGS

A bearing arrangement according to an embodiment of the invention is schematically illustrated in the drawing. It is shown by:

FIG. 1 a graphic diagrammatic illustration of the bearing arrangement with removed sub-element and allocation of the quadrants of a rotation circle;

FIG. 2 a perspective illustration of the bearing arrangement with inserted or installed sub-element in section;

DETAILED DESCRIPTION OF EXAMPLE EMBODIMENTS OF THE INVENTION

Figure 3:
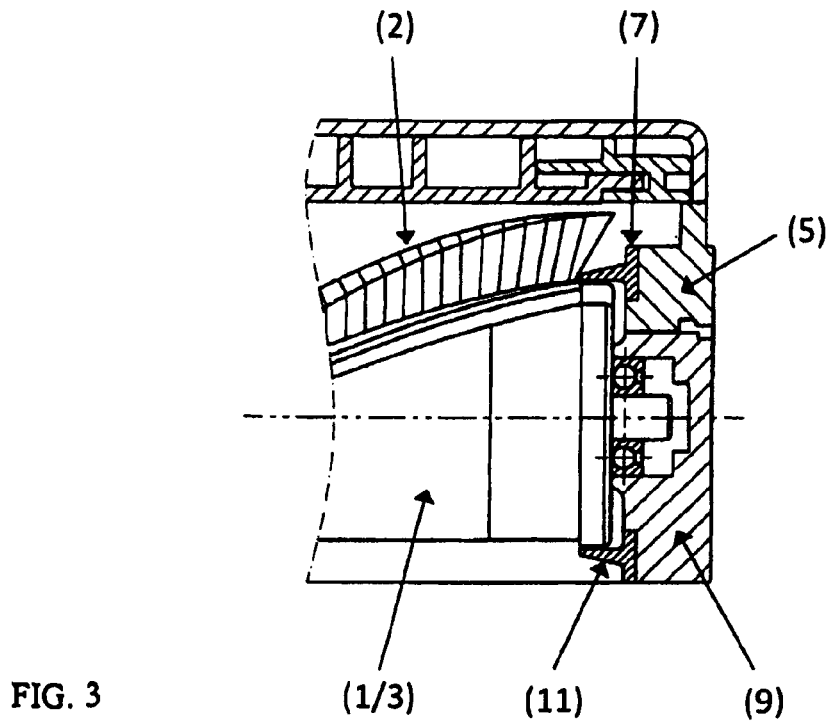
FIG. 3 a vertical section of a part of the bearing arrangement with inserted or installed sub-element.
Figure 4:
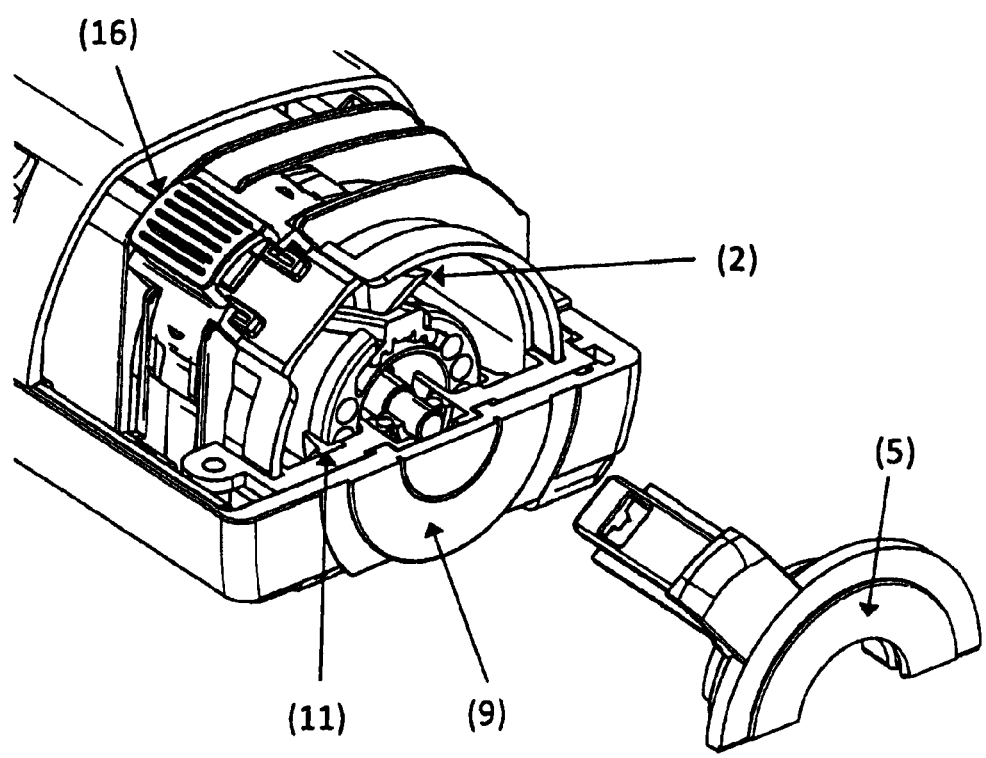
FIG. 4 a further graphic diagrammatic illustration of the bearing arrangement with removed sub-element.

In this arrangement, a brush roller 1 is arranged by end pieces in a bearing structure A of a housing 15 while forming a shaft tunnel 12. In this regard, a spirally extending receiving shaft with a removable brush strip 2 is arranged in the brush roller body 3. In that regard the bearing structure A with a bearing 10 for receiving a shaft end 14 of the brush roller 1 is arranged in a carrier or support arrangement 9 of the housing 15.

The bearing structure A is covered on at least one end face of the housing 15 by a closure part as the support arrangement 9, and consists of a stationary element and a releasable sub-element 5, which releases or uncovers an end face opening 6 for removing the brush strip 2. In this case, this sub-element 5 is releasably fixable or lockable with a catch element or locking element 4 for a corresponding counter support 13 in the brush housing 15, and is unlockable by a push button 16. Thereby the sub-element 5 forms a part of the support arrangement 9. Thus, by the removal of the sub-element 5, thereby the opening 6 as well as the end face opening to the receiving shaft of the brush strip 2 is uncovered.

Furthermore, the sub-element 5 carries a segment of a deflector element 7 arranged concentrically to the brush roller 1, which deflector element 7 corresponds with a counter element 8 in the form of a bead of the brush roller body 3, in order to form a thread deflector for the protection of the bearing locations.

In that regard it is provided that the support arrangement 9 for the bearing 10 of the brush roller 1 is formed, of plastic and comprises a deflector element 11 of metal, which corresponds with the counter element 8 as a bead of plastic on the brush roller body 3.

Further it is provided to fix the bearing 10 in the support arrangement, wherein the shaft end 14 of the brush roller 1 is arranged slidably in the bearing 10 as a slide bearing.

Alternatively the bearing 10 as a ball bearing is fixed on the shaft end 14 of the brush roller 1 and slidably arranged in the support arrangement.

The invention claimed is:

1. An arrangement of a rotating brush roller of a floor care device in the form of a brush vacuum cleaner or a brush attachment or accessory, wherein the brush roller is arranged by outwardly located end pieces thereon engaging bearings in respective support arrangements of a brush housing, and the brush roller comprises a spirally extending receiving groove with an outwardly located through passage for receiving and retaining a continuous brush strip as well as a groove end opening in an end thereof for installation and removal of the brush strip, wherein a first one of the support arrangements comprises an end cover that forms a partially closed end of the brush housing and defines an end face opening for the removal of the brush strip, the first support arrangement further comprises a removable closure part that selectively covers and uncovers the end face opening, the removable closure part includes a holding element that is releasably lockable with a corresponding counter support arranged in the brush housing, and the removable closure part carries a metal first deflector element arranged concentrically to the brush roller in supplementation of a stationary metal second deflector element arranged in the end cover of the first support arrangement, the first deflector element and the second deflector element are arranged to overlap and cooperate with a counter element in the form of a plastic rib on the brush roller body to form a thread deflector.

2. The arrangement according to claim 1, characterized in that the end face opening is formed in an upper area of a rotational path of the brush roller.

3. The arrangement according to claim 1, characterized in that a respective one of the bearings is fixed in a respective one of the support arrangements, and a respective one of the end pieces comprises a shaft end of the brush roller that is slidably arranged in the bearing.

4. The arrangement according to claim 1, characterized in that a respective one of the end pieces comprises a shaft end of the brush roller, and a respective one of the bearings comprises a ball bearing that is fixed on the shaft end of the brush roller and is slidably arranged in a respective one of the support arrangements.

5. A floor care device comprises:
a longitudinally extending housing that defines therein a brush tunnel;
a brush roller that is rotatably received in said brush tunnel, and that comprises a cylindrical brush roller body, a thread deflection counter element as a rim around an end of said brush roller body, and a shaft stub protruding axially from said end of said brush roller body;
a stationary cover that is stationarily connected to said housing, and that covers a portion of an end of said brush tunnel, wherein an access opening into said end of said brush tunnel is left uncovered by said stationary cover;
a bearing that rotatably supports said shaft stub of said brush roller on said stationary cover;
a first deflector element that is provided on said stationary cover and that protrudes inwardly into said brush tunnel; and
a removable cover comprising a cover part that removably covers and uncovers said access opening, a holding element that extends from said cover part and releasably engages with a counter support provided on said housing, and a second deflector element that protrudes inwardly into said brush tunnel;
wherein said second deflector element aligns with and supplements said first deflector element so that said first and second deflector elements together form a circular thread deflector concentric with said thread deflection counter element on said end of said brush roller body, and wherein said circular thread deflector and said thread deflection counter element overlap and cooperate with one another so as to deflect debris away from an area of said bearing.

6. The floor care device according to claim 5, wherein said first and second deflector elements are each respectively made of a metal, and said thread deflection counter element is made of a plastic.

7. The floor care device according to claim 5, wherein said first and second deflector elements each comprise a respective annular circular sector of a circular flange, said circular thread deflector comprises said circular flange made up of said first and second deflector elements, and said circular flange extends concentrically outwardly around an outer circumferential surface of said thread deflection counter element.

8. The floor care device according to claim 7, wherein said thread deflection counter element protrudes radially outwardly beyond an outer circumferential surface of said brush roller body.

9. The floor care device according to claim 5, wherein said thread deflection counter element comprises a rib on said brush roller body.

10. The floor care device according to claim 5, wherein said brush roller body has a spiral groove in an outer circumferential surface thereof, said brush roller further comprises a brush strip that is slidingly engaged into and slidingly removable from said spiral groove, and said access opening exposes and provides access to an open end of said spiral groove at said end of said brush roller body to allow removal and replacement of said brush strip through said access opening.

11. The floor care device according to claim 10, wherein said thread deflection counter element has a gap therein aligning with said spiral groove, an end portion of said brush strip is received in said gap, and said circular thread deflector overlaps radially outwardly over said end portion of said brush strip.

12. The floor care device according to claim 5, wherein said access opening and said cover part of said removable cover both have a shape of an annular circular sector.

13. The floor care device according to claim 12, wherein said annular circular sector spans one-half of a complete circle.

14. The floor care device according to claim 5, wherein said holding element extends from said cover part radially outwardly and axially parallel to an axis of said brush roller, and said counter support comprises a slot in said housing into which said holding element can be slidingly engaged in an axial direction parallel to said axis of said brush roller.

15. The floor care device according to claim 14, wherein said counter support further comprises a catch element that releasably engages said holding element in said slot.

16. The floor care device according to claim 15, wherein said counter support further comprises a push button, which when manually depressed, releases said catch element to enable manual removal of said holding element from said slot and therewith removal of said removable cover thereby uncovering said access opening without use of any tool.

* * * * *